(12) United States Patent
Feichtinger et al.

(10) Patent No.: US 9,289,919 B2
(45) Date of Patent: Mar. 22, 2016

(54) APPARATUS FOR THE PRETREATMENT AND SUBSEQUENT PLASTIFICATION OR AGGLOMERATION OF PLASTICS

(71) Applicant: Erema Engineering Recycling Maschinen und Anlagen Gesellschaft M.B.H., Ansfelden (AT)

(72) Inventors: Klaus Feichtinger, Linz (AT); Manfred Hackl, Linz-Urfahr (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 0 days.

(21) Appl. No.: 14/351,663

(22) PCT Filed: Oct. 12, 2012

(86) PCT No.: PCT/AT2012/050160
§ 371 (c)(1),
(2) Date: Apr. 14, 2014

(87) PCT Pub. No.: WO2013/052988
PCT Pub. Date: Apr. 18, 2013

(65) Prior Publication Data
US 2014/0291427 A1    Oct. 2, 2014

(30) Foreign Application Priority Data

Oct. 14, 2011   (AT) .................................. A 1507/2011

(51) Int. Cl.
*B29C 47/10*    (2006.01)
*B29B 13/10*    (2006.01)
(Continued)

(52) U.S. Cl.
CPC ............. *B29B 13/10* (2013.01); *B01F 15/0289* (2013.01); *B02C 18/086* (2013.01);
(Continued)

(58) Field of Classification Search
CPC .. B01F 7/162; B01F 15/0288; B01F 15/0289; B29B 2017/048; B29B 17/0412; B02C 18/086; B29C 47/1027
USPC ......... 366/76.2, 76.3, 76.4, 76.6, 76.9, 76.91, 366/76.92, 76.93, 154.1, 155.1, 156.1, 366/158.4, 91, 147, 149, 168.1, 172.1, 366/172.2, 200, 314; 425/586–587
See application file for complete search history.

(56) References Cited

U.S. PATENT DOCUMENTS

| 2,927,007 A | 3/1960 | Kaether |
| 3,867,194 A | 2/1975 | Straube |

(Continued)

FOREIGN PATENT DOCUMENTS

| AT | 400315 B | 12/1995 |
| CN | 101186103 A | 5/2008 |

(Continued)

OTHER PUBLICATIONS

International Preliminary Report on Patentability mailed Feb. 3, 2014, from PCT Application No. PCT/AT2012/050160 (13 pages).

(Continued)

*Primary Examiner* — Charles Cooley
(74) *Attorney, Agent, or Firm* — Kilpatrick Townsend & Stockton LLP

(57) ABSTRACT

Disclosed is an apparatus for the pretreatment and subsequent conveying or plastification of plastics, with a container with a mixing and/or comminution implement that is rotatable around an axis of rotation. In a side wall, an aperture is formed, through which the plastics material can be removed, a conveyor being provided, with a screw rotating in a housing. The apparatus is characterized in that the imaginary continuation of the longitudinal axis of the conveyor in a direction opposite to the direction of conveying passes the axis of rotation, there being, on the outflow side, an offset distance between the longitudinal axis and the radius that is parallel to the longitudinal axis, that the L/D ratio of the screw is greater than or equal to 7, and that the compressing format of the screw begins only from a distance (A) of more than 1.5 times the diameter (d) of the screw.

16 Claims, 3 Drawing Sheets

(51) Int. Cl.
| | |
|---|---|
| *B01F 15/02* | (2006.01) |
| *B29B 17/00* | (2006.01) |
| *B29B 17/04* | (2006.01) |
| *B02C 18/08* | (2006.01) |
| *B29C 47/00* | (2006.01) |
| *B29C 47/38* | (2006.01) |
| *B02C 18/22* | (2006.01) |
| *B29B 7/10* | (2006.01) |
| *B29B 7/14* | (2006.01) |
| *B29B 7/18* | (2006.01) |

(52) U.S. Cl.
CPC ............... *B02C18/2216* (2013.01); *B29B 7/10* (2013.01); *B29B 7/14* (2013.01); *B29B 7/18* (2013.01); *B29B 17/0026* (2013.01); *B29B 17/04* (2013.01); *B29B 17/0412* (2013.01); *B29C 47/0009* (2013.01); *B29C 47/0011* (2013.01); *B29C 47/38* (2013.01); *B29B 2017/048* (2013.01); *Y02W 30/62* (2015.05); *Y02W 30/625* (2015.05)

(56) References Cited

U.S. PATENT DOCUMENTS

| | | | |
|---|---|---|---|
| 4,579,288 A | | 4/1986 | McDermid et al. |
| 5,102,326 A | * | 4/1992 | Bacher et al. .................. 425/202 |
| 5,282,548 A | * | 2/1994 | Ishihara ........................ 222/55 |
| 5,651,944 A | * | 7/1997 | Schulz et al. .................. 422/137 |
| 5,783,225 A | * | 7/1998 | Bacher et al. .................. 425/202 |
| 5,882,558 A | * | 3/1999 | Bacher et al. .................. 264/40.4 |
| 5,988,865 A | * | 11/1999 | Bacher et al. .................. 366/76.93 |
| 6,619,575 B1 | * | 9/2003 | Bacher et al. .................. 241/46.11 |
| 6,719,454 B1 | * | 4/2004 | Bacher et al. .................. 366/314 |
| 6,784,214 B1 | * | 8/2004 | Bacher et al. .................. 521/48 |
| 6,883,953 B1 | * | 4/2005 | Bacher et al. .................. 366/76.1 |
| 7,275,703 B2 | * | 10/2007 | Bacher et al. .................. 241/152.2 |
| 7,275,857 B2 | * | 10/2007 | Bacher et al. .................. 366/314 |
| 7,291,001 B2 | * | 11/2007 | Bacher et al. .................. 425/202 |
| 7,309,224 B2 | * | 12/2007 | Bacher et al. .................. 425/202 |
| 7,842,221 B2 | * | 11/2010 | Magni et al. .................. 264/322 |
| 8,399,599 B2 | * | 3/2013 | Hackl et al. .................. 528/308.3 |
| 8,419,997 B2 | * | 4/2013 | Hackl et al. .................. 264/328.17 |
| 8,616,478 B2 | * | 12/2013 | Weigerstorfer et al. ........ 241/57 |
| 8,992,067 B2 | | 3/2015 | Bacher et al. |
| 2004/0202744 A1 | | 10/2004 | Bacher et al. |
| 2004/0232578 A1 | | 11/2004 | Magni et al. |
| 2006/0093696 A1 | * | 5/2006 | Bacher et al. .................. 425/200 |
| 2006/0292259 A1 | * | 12/2006 | Bacher et al. .................. 425/217 |
| 2007/0007375 A1 | * | 1/2007 | Bacher et al. ............. 241/199.12 |
| 2007/0102550 A1 | * | 5/2007 | Lin .............................. 241/277 |
| 2010/0101454 A1 | * | 4/2010 | Wendelin et al. ............. 106/243 |
| 2010/0140381 A1 | * | 6/2010 | Weigerstorfer et al. ........ 241/17 |
| 2011/0049763 A1 | * | 3/2011 | Hackl et al. ............. 264/328.17 |
| 2011/0251368 A1 | * | 10/2011 | Hackl et al. .................. 526/352 |
| 2012/0091609 A1 | * | 4/2012 | Feichtinger et al. ........ 264/37.31 |
| 2012/0200000 A1 | | 8/2012 | Klein et al. |
| 2013/0092768 A1 | * | 4/2013 | Feichtinger et al. ............. 241/20 |
| 2013/0113139 A1 | * | 5/2013 | Weigerstorfer et al. ...... 264/340 |
| 2013/0168201 A1 | * | 7/2013 | Hackl et al. .................. 193/2 R |
| 2014/0234461 A1 | * | 8/2014 | Feichtinger et al. .......... 425/202 |
| 2014/0234462 A1 | * | 8/2014 | Feichtinger et al. .......... 425/202 |
| 2014/0239104 A1 | * | 8/2014 | Feichtinger et al. ....... 241/188.1 |
| 2014/0248388 A1 | * | 9/2014 | Feichtinger et al. .......... 425/203 |
| 2014/0252147 A1 | | 9/2014 | Feichtinger et al. |
| 2014/0252148 A1 | | 9/2014 | Feichtinger et al. |
| 2014/0271968 A1 | | 9/2014 | Feichtinger et al. |
| 2014/0287081 A1 | | 9/2014 | Feichtinger et al. |
| 2014/0295016 A1 | | 10/2014 | Feichtinger et al. |
| 2014/0299700 A1 | | 10/2014 | Feichtinger et al. |
| 2014/0312151 A1 | | 10/2014 | Feichtinger et al. |
| 2015/0239154 A1 | * | 8/2015 | Feichtinger ......... B29B 17/0036 |

FOREIGN PATENT DOCUMENTS

| | | | | |
|---|---|---|---|---|
| DE | 2839446 | B1 | | 1/1980 |
| DE | 3525554 | A1 | | 2/1986 |
| DE | 10140215 | A1 | | 2/2003 |
| DE | 202009015256 | U1 | | 4/2010 |
| EP | 0045734 | A1 | | 2/1982 |
| EP | 0103754 | A1 | | 3/1984 |
| EP | 0123771 | A1 | | 11/1984 |
| EP | 0321742 | A1 | | 6/1989 |
| EP | 0701505 | A1 | | 3/1996 |
| EP | 0735945 | A1 | | 10/1996 |
| EP | 0911131 | A1 | | 4/1999 |
| EP | 1181141 | A1 | | 2/2002 |
| EP | 1233855 | A1 | | 8/2002 |
| EP | 0820375 | A1 | | 1/2003 |
| EP | 1273412 | A1 | | 1/2003 |
| EP | 1401623 | A1 | | 3/2004 |
| EP | 1628812 | A1 | | 3/2006 |
| EP | 1628813 | A1 | | 3/2006 |
| EP | 2012997 | A1 | | 1/2009 |
| EP | 2196255 | A1 | | 6/2010 |
| ES | 2214171 | T1 | | 9/2004 |
| GB | 2030472 | A1 | | 4/1980 |
| JP | A-7-148736 | | | 6/1995 |
| JP | 2001-26019 | A | | 1/2001 |
| JP | 2001-30244 | A | | 2/2001 |
| SU | 536062 | A1 | | 11/1976 |
| UA | 1427 | U | | 10/2002 |
| WO | WO 97/18071 | A1 | | 5/1997 |
| WO | WO 0181058 | A1 | * | 11/2001 |
| WO | WO 02/36318 | A1 | | 5/2002 |
| WO | WO 03/004236 | A1 | | 1/2003 |
| WO | WO 03/103915 | A1 | | 12/2003 |
| WO | WO 2004087391 | A1 | * | 10/2004 ............. B29B 17/00 |
| WO | WO 2004/108379 | A1 | | 12/2004 |
| WO | WO 2010/118447 | A1 | | 10/2010 |
| WO | WO 2011/051154 | A1 | | 5/2011 |

OTHER PUBLICATIONS

International Search Report mailed Feb. 6, 2013, from PCT Application No. PCT/AT2012/050160 (5 pages).
"Recyclinganlage Mit Grosser Flexibilitaet Und Verbesserter Effizienz: High-Flexibility Recycling System with Improved Efficiency," Plastverarbeiter, Huethig GmbH, Heidelberg, DE, vol. 43, No. 10, Oct. 1, 1992, pp. 36-38, XP000310013, ISSN: 0032-1338.
Kowalska B., "Genutete Einzugszonen Konstruktionsvarianten Fuer Einschneckenextruder: Grooved Feed Zones Design Variations for Single-Screw Extruders," Kunstoffe International, Carl Hanser Verlag, Munchen, DE, vol. 90, No. 2, Feb. 1, 2000, pp. 34-36, 38, XP000936826, ISSN: 0023-5563.
Bacher H., "Recycling Von Thermplastischen Primaerabfaellen: Recycling Primary Thermoplastic Waste, "Plasteverbarbeiter, Huethig GmbH, Heidelberg, DE, vol. 46, No. 2, Feb. 1, 1995, pp. 94, 97, & 98, XP000494391, ISSN: 0032-1338.
ASN 14351677. Claims filed Mar. 24, 2015.
ASN 14351869. Claims filed Mar. 11, 2015.

* cited by examiner

APPARATUS FOR THE PRETREATMENT AND SUBSEQUENT PLASTIFICATION OR AGGLOMERATION OF PLASTICS

This application is a U.S. National Phase of International Application No. PCT/AT2012/050160, filed Oct. 12, 2012, which claims priority to Austrian Patent Application No. A 1507/2011, filed Oct. 14, 2011, the disclosures of which are incorporated by reference herein.

BACKGROUND

The invention relates to an apparatus for the pretreatment and subsequent plastification or agglomeration of plastics.

The prior art reveals numerous similar apparatuses of varying design, comprising a receiver or cutter compactor for the comminution, heating, softening and treatment of a plastics material to be recycled, and also, attached thereto, a conveyor or extruder for the melting of the material thus prepared. The aim here is to obtain a final product of the highest possible quality, mostly in the form of pellets.

By way of example, EP 123 771 or EP 303 929 describe apparatuses with a receiver and, attached thereto, an extruder, where the plastics material introduced into the receiver is comminuted through rotation of the comminution and mixing implements and is fluidized, and is simultaneously heated by the energy introduced. A mixture with sufficiently good thermal homogeneity is thus formed. This mixture is discharged after an appropriate residence time from the receiver into the screw-based extruder, and is conveyed and, during this process, plastified or melted. The arrangement here has the screw-based extruder approximately at the level of the comminution implements. The softened plastics particles are thus actively forced or stuffed into the extruder by the mixing implements.

Most of these designs, which have been known for a long time, are unsatisfactory in respect of the quality of the treated plastics material obtained at the outgoing end of the screw, and/or in respect of the quantitative output of the screw. Studies have shown that the requirements placed upon the screw downstream of the container, mostly a plastifying screw, differ during the course of the operation.

For material that is thermally and mechanically homogeneous, there is usually a quality improvement in the product obtained at the outgoing end of the screw when the flight depth of the metering zone of the screw is very large and the screw rotation rate is kept very small. Studies have shown that the reason for this is that this type of screw geometry subjects the processed material to a low level of shear. The shear level to which the processed product is exposed (shear rate) is calculated from the circumferential velocity of the screw, divided by the flight depth of the screw. This type of screw geometry subjects the material only to a low level of mechanical and thermal stress.

However, if it is desirable to increase the quantitative output of the screw or to improve the performance for example of a shredder-extruder combination, the screw rotation rate must then be raised, and this means that the shear level is also raised. However, this causes the screw to subject the processed material to higher mechanical and thermal stress.

However, an effect that occurs both with slow-running and deep-cut screws having large flight depth and with fast-running screws is that, as previously mentioned, differences in quality of individual batches of material introduced to the screw, e.g. differences in flake size and/or differences in temperature of the plastics material, have a disadvantageous effect with regard to inhomogeneity of the plastics material obtained at the outgoing end of the screw. In order to compensate for this inhomogeneity, the temperature profile of the extruder is in practice raised, and this means that additional energy has to be introduced into the plastic, thus subjecting the plastics material to the thermal damage mentioned and increasing the amount of energy required. Another result here is that the viscosity of the plastics material obtained at the outgoing end of the extruder is reduced, and this makes the material more free-flowing, with concomitant difficulties in the further processing of this material.

It can be seen from this that the process parameters that are advantageous for obtaining material of good quality at the outgoing end of the screw are mutually contradictory.

The fundamental task of the extruder screw is intake, conveying, and melting or agglomeration of the plastics material and then homogenization of the same. For this purpose, it has to generate a certain pressure.

A traditional extruder screw with constantly increasing root diameter is fundamentally divided into three functional regions. This type of three-zone screw is the most commonly used screw type, which can process very many types of material. In the intake zone, the material is drawn into the region of the screw and conveyed onward through the rotation of the screw. In the compression zone, the material is compacted by virtue of the decreasing flight depth, and melted or agglomerated. In the metering zone, the melt or the agglomerate is brought to the desired processing temperature and homogenized and fully melted. The necessary pressure is moreover generated in order to overcome the resistance of the die. This has an effect on the throughput rate.

Factors of substantial importance for the melting behaviour or agglomeration behaviour of the pretreated or softened polymer material passing from the cutter compacter into the extruder, and for the product quality finally obtained, and subsequently for the throughput rate or quantitative output rate of the extruder are accordingly inter alia the length of the individual regions or zones, and also the parameters of the screw, e.g. its thickness, flight depths, etc.

However, particular conditions are present in the present cutter compacter-extruder combinations, since the material which passes into the extruder is not introduced directly, untreated and cold but instead has already been pretreated in the cutter compacter, i.e. heated, softened and/or partially crystallized, etc. This is among the decisive factors for the way in which the extrusion process proceeds, and for the final quality of the melt or of the final products.

The two systems, i.e. the cutter compacter and the extruder, have an effect on each other, and the results of the extrusion process are greatly dependent on the pretreatment, just as the extrusion process can compensate for, and have an effect on, certain parameters of the pretreatment process.

The interface between the cutter compacter and the extruder, i.e. the region where the pretreated material is transferred from the cutter compacter into the extruder, is therefore an important region. Firstly, this is a purely mechanical problem point, since two apparatuses that operate differently must be coupled to one another here. This interface can moreover also pose problems for the polymer material, since the material here is mostly in a greatly softened condition, close to the melting range, but is not permitted to melt. If the temperature is too low, the throughput and the quality fall, but if the temperature is too high and undesired melting occurs at some points, the intake becomes blocked.

It is moreover difficult to achieve precision of metering and feed into the extruder, since a closed system is involved and there is no direct access to the intake, but instead the material is fed into the extruder from the cutter compacter, and the feed cannot therefore be influenced directly, for example by way of a gravimetric metering system.

It is therefore of decisive importance that mechanical aspects of this transition are carefully designed, i.e. involving an understanding of the properties of the polymer, and that, at the same time, the cost-effectiveness of the entire process is taken into account, i.e. high throughput and appropriate quality. Some of the preconditions that require attention here are contradictory.

Another feature shared by the apparatuses known from the prior art and mentioned in the introduction is that the direction of conveying or of rotation of the mixing and comminution implements, and therefore the direction in which the particles of material circulate in the receiver, and the direction of conveying of the extruder, are in essence identical or have the same sense. This arrangement, selected intentionally, was the result of the desire to maximize stuffing of the material into the screw, or to force-feed the screw. This concept of stuffing the particles into the conveying screw or extruder screw in the direction of conveying of the screw was also very obvious and was in line with the familiar thinking of the person skilled in the art, since it means that the particles do not have to reverse their direction of movement and there is therefore no need to exert any additional force for the change of direction. An objective here, and in further derivative developments, was always to maximize screw fill and to amplify this stuffing effect. By way of example, attempts have also been made to extend the intake region of the extruder in the manner of a cone or to curve the comminution implements in the shape of a sickle, so that these can act like a trowel in feeding the softened material into the screw. Displacement of the extruder, on the inflow side, from a radial position to a tangential position in relation to the container further amplified the stuffing effect, and increased the force with which the plastics material from the circulating implement was conveyed or forced into the extruder.

Apparatuses of this type are in principle capable of functioning, and they operate satisfactorily, although with recurring problems:

By way of example, an effect repeatedly observed with materials with low energy content, e.g. PET fibres or PET foils, or with materials which at a low temperature become sticky or soft, e.g. polylactic acid (PLA) is that when, intentionally, stuffing of the plastics material into the intake region of the extruder, under pressure, is achieved by components moving in the same sense, this leads to premature melting of the material immediately after, or else in, the intake region of the extruder. This firstly reduces the conveying effect of the extruder, and secondly there can also be some reverse flow of this melt into the region of the cutter compactor or receiver, with the result that flakes that have not yet melted adhere to the melt, and in turn the melt thus cools and to some extent solidifies, with resultant formation of a clump or conglomerate made of to some extent solidified melt and of solid plastics particles. This causes blockage on the intake of the extruder and caking of the mixing and comminution implements. A further consequence is reduction of the throughput of the extruder, since adequate filling of the screw is no longer achieved. Another possibility here is that movement of the mixing and comminution implements is prevented. In such cases, the system normally has to be shut down and thoroughly cleaned.

Problems also occur with polymer materials which have already been heated in the cutter compactor up to the vicinity of their melting range. If overfilling of the intake region occurs here, the material melts and intake is impaired.

Problems are also encountered with fibrous materials that are mostly orientated and linear, with a certain amount of longitudinal elongation and low thickness or stiffness, for example plastics foils cut into strips. A main reason for this is that the elongate material is retained at the outflow end of the intake aperture of the screw, where one end of the strip protrudes into the receiver and the other end protrudes into the intake region. Since the mixing implements and the screw are moving in the same sense or exert the same conveying-direction component and pressure component on the material, both ends of the strip are subjected to tension and pressure in the same direction, and release of the strip becomes impossible. This in turn leads to accumulation of the material in the said region, to a narrowing of the cross section of the intake aperture, and to poorer intake performance and, as a further consequence, to reduced throughput. The increased feed pressure in this region can moreover cause melting, and this in turn causes the problems mentioned in the introduction.

Various extruders have been attached to co-rotating cutter compacters of this type, and all of the results here have in principle been acceptable and interesting. However, the applicant has initiated comprehensive studies with the aim of achieving even more improvement of the entire system.

SUMMARY

It is therefore an object of the present invention to overcome the disadvantages mentioned and to improve an apparatus of the type described in the introduction in such a way as to permit problem-free intake by the screw, not only of conventional materials but also of those that are sensitive or strip-shaped, and to permit processing or treatment of these materials to give material of high quality, with high throughput, while making efficient use of time, saving energy, and minimizing space requirement.

The characterizing features of certain embodiments achieve this object in an apparatus of the type mentioned in the introduction.

A first provision here is that the imaginary continuation of the central longitudinal axis of the extruder, if this has only a single screw, or the longitudinal axis of the screw closest to the intake aperture, if the extruder has more than one screw, in a direction opposite to the direction of conveying of the extruder, passes, and does not intersect, the axis of rotation, where, on the outflow side, there is an offset distance between the longitudinal axis of the extruder, if this has a single screw, or the longitudinal axis of the screw closest to the intake aperture, and the radial of the container and that is parallel to the longitudinal axis and that proceeds outwards from the axis of rotation of the mixing and/or comminution implement in the direction of conveying of the extruder.

The direction of conveying of the mixing implements and the direction of conveying of the extruder are therefore no longer in the same sense, as is known from the prior art, but instead are at least to a small extent in the opposite sense, and the stuffing effect mentioned in the introduction is thus reduced. The intentional reversal of the direction of rotation of the mixing and comminution implements in comparison with apparatuses known hitherto reduces the feed pressure on the intake region, and the risk of overfilling decreases. In this way, excess material is not stuffed or trowelled with excess pressure into the intake region of the extruder, but instead, in contrast, there is in fact in turn a tendency to remove excess material from that region, in such a way that although there is always sufficient material present in the intake region, the additional pressure exerted is small or almost zero. This method can provide adequate filling of the extruder screw and constant intake of sufficient material by the screw, without any overfilling of the screw with, as a further consequence, local pressure peaks where the material could melt.

Melting of the material in the region of the extruder intake is thus prevented, and operating efficiency is therefore increased, maintenance intervals are therefore lengthened, and downtime due to possible repairs and cleaning measures is reduced.

By virtue of the reduced feed pressure, displaceable elements which can be used in a known manner to regulate the degree of filling of the screw react markedly more sensitively, and the degree of filling of the screw can be adjusted with even greater precision. This makes it easier to find the ideal point at which to operate the system, in particular for relatively heavy materials, for example regrind made of high-density polyethylene (HDPE) or PET.

Surprisingly and advantageously it has moreover been found that operation in the opposite sense, according to the invention, improves intake of materials which have already been softened almost to the point of melting. In particular when the material is already in a doughy or softened condition, the screw cuts the material from the doughy ring adjacent to the container wall. In the case of a direction of rotation in the direction of conveying of the extruder screw, this ring would instead be pushed onward, and removal of an outer layer by the screw would not be possible, with resultant impairment of intake. The reversal of the direction of rotation, according to the invention, avoids this.

Furthermore, the retention or accumulation phenomena formed in the case of the treatment of the above-described strip-shaped or fibrous materials can be resolved more easily, or do not occur at all, since, at the aperture edge situated in the direction of rotation of the mixing implements on the outflow side or downstream, the direction vector for the mixing implements and the direction vector for the extruder point in almost opposite directions, or in directions that at least to a small extent have opposite sense, and an elongate strip cannot therefore become curved around, and retained by, the said edge, but instead becomes entrained again by the mixing vortex in the receiver.

The overall effect of the design according to the invention is that intake performance is improved and throughput is markedly increased. The stability and performance of the entire system made of cutter compactor and extruder is thus increased.

A factor closely associated with this is the particular format of the screw, specifically in the intake region and in the compression zone. Surprisingly, the applicant has found here that a specific screw geometry can provide still more improvement in intake behaviour. The L/D ratio of the screw here, starting from the end of the intake aperture, is ≥7. In other words, the ratio of the length of the screw—measured from the edge of the intake aperture situated downstream in the direction of conveying of the screw, or from the point situated on this edge and situated furthest downstream in the direction of conveying of the screw—to the end of the screw or of the housing that is distal, remote from the container, or to the first, furthest upstream, discharge aperture for the melt or for the agglomerate, formed in the housing, to the nominal diameter of the screw is ≥7. The screw portion enclosed around its entire circumference by the housing begins from the edge of the intake aperture situated downstream in the direction of conveying of the screw. The diameter of the screw is the average diameter in the region downstream of the intake aperture.

Furthermore, the compressing format of the screw begins only from a distance A of more than 1.5 times the diameter of the screw—measured from the edge of the intake aperture that is situated downstream in the direction of conveying of the screw, or from the point situated on this edge and situated furthest downstream in the conveying direction of the screw. This ensures non-aggressive introduction and avoidance or compensation of possible local peak pressures exerted on the material or overfeed.

In the region in front of this, the format of the screw is in essence compressionless, i.e. non-compacting, or indeed decompressing. This is specifically advantageous in the region of the intake.

The beginning of the compressing format of the screw is the point at which the helix angle of the screw is ≥1° or at which this value is for the first time achieved and exceeded. In the region in front of this, the helix angle is <1° and the screw has in essence no, or almost no, compressing effect. This helix angle of the screw is determined by taking a section through the screw in the centre along its central longitudinal axis. The lowest point is taken within each screw flight, and the points are connected to one another. This gives a straight line or a curve, and the angle of this in relation to the longitudinal axis of the screw or in relation to a parallel to the longitudinal axis is the helix angle. The helix angle is therefore a measure of the compressing properties of the screw or for the compacting effect of the screw on the material. The greater the helix angle, the greater the compressing effect of the screw. However, in the region <1° the compressing effect remains negligibly small. Although the helix angle cannot be negative, in the case of a screw with decompressing format, the gradient of these straight lines drawn through the points, seen in the direction of conveying, is negative.

On the one hand, the provision of a certain zone that does not generate pressure has the advantage of introducing energy into the material in a non-aggressive manner without excessive shear, e.g. through heating systems attached on the extruder. On the other hand, an excessively long zone that does not generate pressure lengthens the extruder unnecessarily, and this is all the more true when indeed there is no need for an excessively long zone that does not generate pressure, since the material from the cutter compacter has in any case already been appropriately preheated. The use of the preheated and homogenized material from the cutter compacter also provides the possibility of making the compression zone shorter, since there is already sufficient internal energy present in the material, and all that is then required is a short compression zone for melting the material.

A specific design of a cutter compacter-extruder system is thus provided, comprising the following: a specially designed cutter compacter with specific direction of rotation of the implements, for transferring the softened material to the extruder in a manner that is effective but non-aggressive, and a specially designed extruder, with a screw which specifically in combination with the said cutter compacter provides surprisingly good intake and then compacts the material. As mentioned, the intake performance is one of the factors determining the quality of the material of the melt or of the agglomerate and of the final product, and also determining the throughput of the system.

Comparative experiments carried out by the applicant here have given the following results:

A fibrous biopolymer, namely polylactic acid (PLA), was treated here firstly in a system according to the invention according to FIG. 1 or 2 (contra-rotating, L/D=14, A=2) and secondly in a known system of the same type of design (co-rotating L/D=15, A=2.5), with otherwise identical parameters.

Specimens of the melt were taken continuously at the end of the extruder, and in each case the MFI value (Melt Flow Index in g/10 min) according to ISO1133:1997 was determined. FIG. 5 collates these results.

The range of variation of the MFI values is seen to be markedly greater with the known system. One of the reasons for this may be that the filling of the screw is non-uniform; in the event of underfill, this leads to oxidative and thermal degradation of the material, and the material thus becomes more free-flowing and the MFI value thus increases. This could be due to increased hold-up of the material at the intake, leading to phases of underfeed and phases of overfeed, which then leads to these variations in viscosity values.

It is desirable to achieve maximum constancy of MFI value and at the same time to obtain an MFI value which is as close as possible to the initial value for the treated material. The system according to the invention achieves both, and, as can be seen from FIG. 5, constancy is greater and the range of variation of the MFI values is substantially smaller.

Further advantageous embodiments of the invention are described via the following features:

In a particularly advantageous embodiment, the compressing format of the screw begins in the region in front of a distance B which is maximally 30 times, in particular which is maximally 20 times, the diameter, measured from the edge of the intake aperture situated downstream in the conveying direction of the screw, or from the point of the intake aperture situated furthest downstream. The zone that does not generate pressure does not need to be, or is not permitted to be, too long. Firstly, this would make the system unnecessarily long, and secondly excessively lengthy conveying of the material prior to melting or compaction is difficult and also not conducive to quality.

According to another advantageous embodiment with improved performance capability, the ratio of the length L of the screw, measured from the edge situated downstream in relation to the direction of conveying, or from the point of the intake aperture situated furthest downstream, to the discharge aperture formed in the housing, at the end of the screw remote from the container, to the nominal diameter d of the screw is ≥10, in particular ≥14.

Furthermore, it is advantageous for intake behaviour if the compressing format of the screw begins only from a distance A of more than twice, preferably three times, the diameter d of the screw, measured from the edge of the intake aperture situated downstream in the direction of conveying of the screw, or from the furthest downstream point of the intake aperture.

In a design that is advantageous and that provides effective melt performance, the length of the compressing format of the screw, i.e. for a 3-zone screw the length of the compression zone as far as the metering zone, is in the range from 0.5 to 7 times, preferably from 1 to 5 times, the diameter of the screw.

According to one advantageous development of the invention, the extruder is arranged on the receiver in such a way that the scalar product of the direction vector (direction vector that is associated with the direction of rotation) that is tangential to the circle described by the radially outermost point of the mixing and/or comminution implement or to the plastics material transported past the aperture and that is normal to a radial of the receiver, and that points in the direction of rotation or of movement of the mixing and/or comminution implement, and of the direction vector that is associated with the direction of conveying of the extruder at each individual point or in the entire region of the aperture or at each individual point or in the entire region immediately radially in front of the aperture is zero or negative. The region immediately radially in front of the aperture is defined as that region which is in front of the aperture and at which the material is just about to pass through the aperture but has not yet passed the aperture. The advantages mentioned in the introduction are thus achieved, and there is effective avoidance of all types of agglomeration in the region of the intake aperture, brought about by stuffing effects. In particular here, there is also no dependency on the spatial arrangement of the mixing implements and of the screw in relation to one another, and by way of example the orientation of the axis of rotation does not have to be normal to the basal surface or to the longitudinal axis of the extruder or of the screw. The direction vector that is associated with the direction of rotation and the direction vector that is associated with the direction of conveyance lie within a, preferably horizontal, plane, or in a plane orientated so as to be normal to the axis of rotation.

In another advantageous formation, the angle included between the direction vector that is associated with the direction of rotation of the mixing and/or comminution implement and the direction vector that is associated with the direction of conveying of the extruder is greater than or equal to 90° and smaller than or equal to 180°, where the angle is measured at the point of intersection of the two direction vectors at the edge of the aperture that is situated upstream in relation to the direction of rotation or of movement, in particular at the point that is on this edge or on the aperture and is situated furthest upstream. This therefore describes the range of angles within which the extruder must be arranged on the receiver in order to achieve the advantageous effects. In the entire region of the aperture or at each individual point of the aperture, the forces acting on the material are therefore orientated at least to a small extent in an opposite sense, or in the extreme case the orientation is perpendicular and pressure-neutral. At no point of the aperture is the scalar product of the direction vectors of the mixing implements and of the screw positive, and no excessive stuffing effect occurs even in a subregion of the aperture.

Another advantageous formation of the invention provides that the angle included between the direction vector that is associated with the direction of rotation or of movement and the direction vector that is associated with the direction of conveying is from 170° to 180°, measured at the point of intersection of the two direction vectors in the middle of the aperture. This type of arrangement is relevant by way of example when the extruder is arranged tangentially on the cutter compactor.

In order to ensure that no excessive stuffing effect occurs, the distance, or the offset, between the longitudinal axis and the radial can advantageously be greater than or equal to half of the internal diameter of the housing of the extruder or of the screw.

It can moreover be advantageous for these purposes to set the distance, or offset, between the longitudinal axis and the radial to be greater than or equal to 7%, or still more advantageously greater than or equal to 20%, of the radius of the receiver. In the case of extruders with a prolonged intake region or with grooved bushing or with extended hopper, it can be advantageous for this distance or offset to be greater than or equal to the radius of the receiver. This is particularly true for cases where the extruder is attached tangentially to the receiver or runs tangentially to the cross section of the container.

It is particularly advantageous if the longitudinal axis of the extruder or of the screw or the longitudinal axis of the screw closest to the intake aperture runs tangentially with respect to the inner side of the side wall of the container, or the inner wall of the housing does so, or the enveloping end of the screw does so, it being preferable that there is a drive connected to the end of the screw, and that the screw provides conveying, at its opposite end, to a discharge aperture which is in particular an extruder head, arranged at the end of the housing.

In the case of extruders that are radially offset, but not arranged tangentially, it is advantageous to provide that the imaginary continuation of the longitudinal axis of the extruder in a direction opposite to the direction of conveying, at least in sections, passes, in the form of a secant, through the space within the receiver.

It is advantageous to provide that there is immediate and direct connection between the aperture and the intake aperture, without substantial separation or a transfer section, e.g. a conveying screw. This permits effective and non-aggressive transfer of material.

The reversal of the direction of rotation of the mixing and comminution implements circulating in the container can certainly not result from arbitrary action or negligence, and it is not possible—either in the known apparatuses or in the apparatus according to the invention—simply to allow the mixing implements to rotate in the opposite direction, in particular because the arrangement of the mixing and comminution implements is in a certain way asymmetrical or direction-oriented, and their action is therefore only single-sided or unidirectional. If this type of equipment were to be rotated intentionally in the wrong direction, a good mixing vortex would not form, and there would be no adequate comminution or heating of the material. Each cutter compactor therefore has its unalterably prescribed direction of rotation of the mixing and comminution implements.

In this connection, it is particularly advantageous to provide that the manner of formation, set-up, curvature and/or arrangement of the frontal regions or frontal edges that are associated with the mixing and/or comminution implements, act on the plastics material and point in the direction of rotation or of movement, differs when comparison is made with the regions that, in the direction of rotation or of movement, are at the rear or behind.

An advantageous arrangement here provides that, on the mixing and/or comminution implement, implements and/or blades are arranged which, in the direction of rotation or of movement, have a heating, comminuting and/or cutting effect on the plastics material. The implements and/or blades can either be fastened directly on the shaft or preferably be arranged on a rotatable implement carrier or, respectively, a carrier disc arranged in particular parallel to the basal surface, or be formed therein or moulded onto the same, optionally as a single piece.

In principle, the effects mentioned are relevant not only to extruders or agglomerators with a high level of compressing and melting effect but also to conveying screws that have less compressing effect. Here again, local overfeed is avoided.

In another particularly advantageous formation, it is provided that the receiver is in essence cylindrical with a level basal surface and with, orientated vertically in relation thereto, a side wall which has the shape of the jacket of a cylinder. In another simple design, the axis of rotation coincides with the central axis of the receiver. In another advantageous formation, the axis of rotation or the central axis of the container are orientated vertically and/or normally in relation to the basal surface. These particular geometries optimize intake performance, with an apparatus design that provides stability and simple construction.

In this connection it is also advantageous to provide that the mixing and/or comminution implement or, if a plurality of mutually superposed mixing and/or comminution implements are provided, the lowest mixing and/or comminution implement closest to the base is arranged at a small distance from the basal surface, in particular in the region of the lowest quarter of the height of the receiver, and also that the aperture is similarly arranged. The distance here is defined and measured from the lowest edge of the aperture or of the intake aperture to the container base in the edge region of the container. There is mostly some rounding of the edge at the corner, and the distance is therefore measured from the lowest edge of the aperture along the imaginary continuations of the side wall downwards to the imaginary outward continuation of the container base. Distances with good suitability are from 10 to 400 mm.

It is also advantageous for the processing if the radially outermost edges of the mixing and/or comminution implements almost reach the side wall.

The container does not necessarily have to have a cylindrical shape with circular cross section, even though this shape is advantageous for practical reasons and reasons of manufacturing technology. When container shapes that deviate from the cylindrical shape with circular cross section, examples being containers having the shape of a truncated cone or cylindrical containers which, in plan view, are elliptical or oval, a calculation is required for conversion to a cylindrical container which has circular cross section and the same volume capacity, on the assumption that the height of this imaginary container is the same as its diameter. Container heights here which are substantially higher than the resultant mixing vortex (after taking into account the distance required for safety) are ignored, since this excessive container height is not utilized and it therefore has no further effect on the processing of the material.

The expression extruder and compressor in the present text mean extruders used for complete or partial melting of the material, for example those having a conventional three-zone screw, and also extruders used to agglomerate, but not melt, the softened material. Screws with agglomerating effect subject the material to severe compression and shear only for a short time, but do not plastify the material. The outgoing end of the agglomerating screw therefore delivers material which has not been completely melted but which instead is composed of particles incipiently melted only at their surface, which have been caked together as if by sintering. However, in both cases the screw exerts pressure on the material and compacts the same.

All of the examples described in the figure below depict compressing single-screw extruders. However, it is also possible as an alternative to provide twin- or multiscrew extruders, in particular with a plurality of identical screws, which at least have the same diameters d.

BRIEF DESCRIPTION OF THE DRAWINGS

Further features and advantages of the invention are apparent from the description of the inventive examples below of the subject matter of the invention, which are not to be interpreted as restricting, and which the drawings depict diagrammatically and not to scale.

Figure 1:
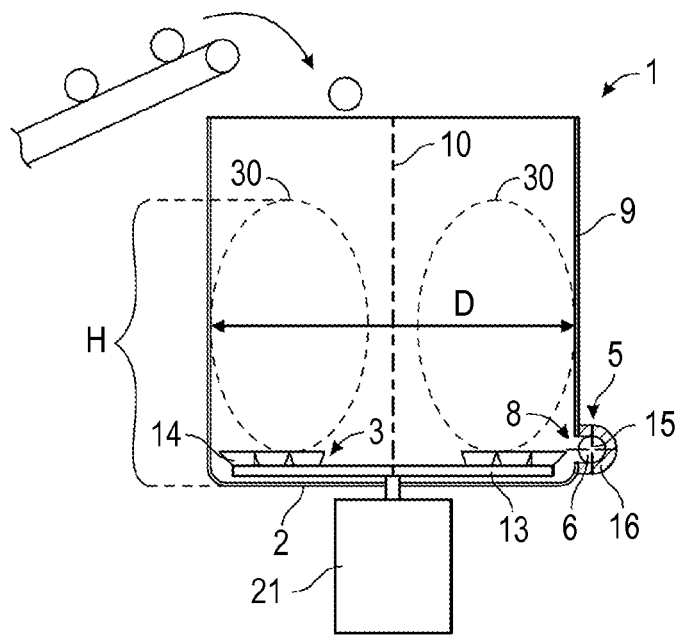
FIG. 1 shows a vertical section through an apparatus according to the invention with extruder attached approximately tangentially.

Neither the containers, nor the screws nor the mixing implements are to scale, either themselves or in relation to one another, in the drawings. By way of example, therefore, the containers are in reality mostly larger, or the screws longer, than depicted here.

DETAILED DESCRIPTION

Figure 2:
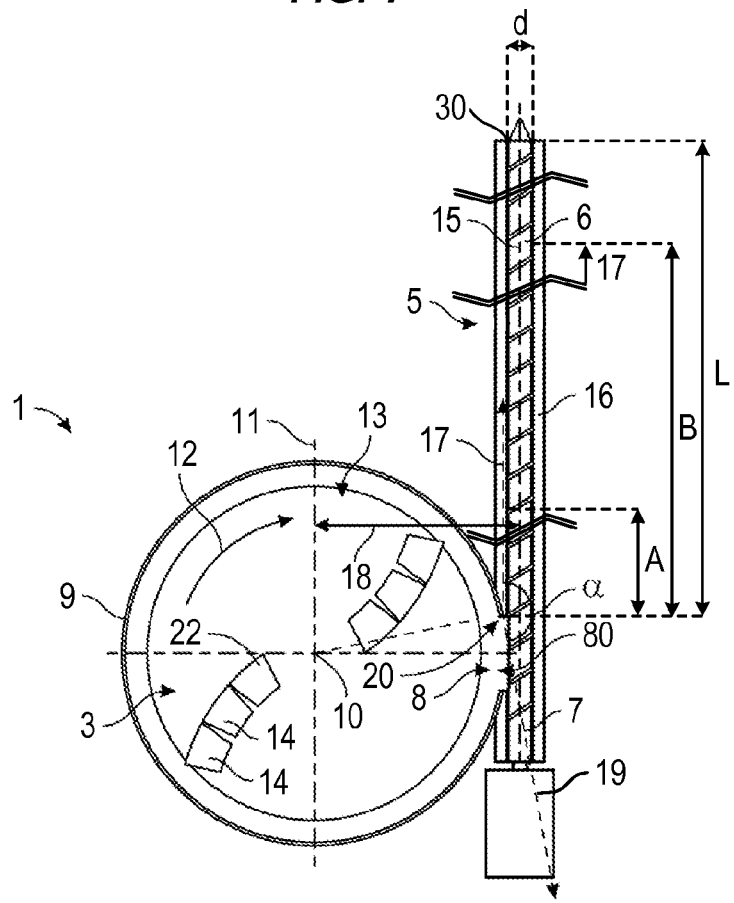
FIG. 2 shows a horizontal section through the embodiment of FIG. 1.

The advantageous cutter compactor-extruder combination depicted in FIG. 1 and FIG. 2 for the treatment or recycling of plastics material has a cylindrical container or cutter compactor or shredder 1 with circular cross section, with a level, horizontal basal surface 2 and with a vertical side wall 9 oriented normally thereto with the shape of a cylinder jacket.

Arranged at a small distance from the basal surface 2, at most at about 10 to 20%, or optionally less, of the height of the side wall 9—measured from the basal surface 2 to the uppermost edge of the side wall 9—is an implement carrier 13 or a level carrier disc orientated parallel to the basal surface 2, which carrier or disc can be rotated, in the direction 12 of rotation or of movement indicated by an arrow 12, around a central axis 10 of rotation, which is simultaneously the central axis of the container 1. A motor 21, located below the container 1, drives the carrier disc 13. On the upper side of the carrier disc 13, blades or implements, e.g. cutter blades, 14 have been arranged, and together with the carrier disc 13 form the mixing and/or comminution implement 3.

As indicated in the diagram, the blades 14 are not arranged symmetrically on the carrier disc 13, but instead have a particular manner of formation, set-up or arrangement on their frontal edges 22 facing in the direction 12 of rotation or of movement, so that they can have a specific mechanical effect on the plastics material. The radially outermost edges of the mixing and comminution implements 3 reach a point which is relatively close to, about 5% of the radius 11 of the container 1 from, the inner surface of the side wall 9.

The container 1 has, near the top, a charging aperture through which the product to be processed, e.g. portions of plastics foils, is charged by way of example by means of a conveying device in the direction of the arrow. The container 1 can, as an alternative, be a closed container and capable of evacuation at least as far as an industrial vacuum, the material being introduced by way of a system of valves. The said product is received by the circulating mixing and/or comminution implements 3 and is raised to form a mixing vortex 30, where the product rises along the vertical side wall 9 and, approximately in the region of the effective container height H, falls back again inward and downward into the region of the centre of the container, under gravity. The effective height H of the container 1 is approximately the same as its internal diameter D. In the container 1, a mixing vortex 30 is thus formed, in which the material is circulated in a vortex both from top to bottom and also in the direction 12 of rotation. By virtue of this particular arrangement of the mixing and comminution elements 3 or the blades 14, this type of apparatus can therefore be operated only with the prescribed direction 12 of rotation or movement, and the direction 12 of rotation cannot be reversed readily or without additional changes.

The circulating mixing and comminution implements 3 comminute and mix the plastics material introduced, and thereby heat and soften it by way of the mechanical frictional energy introduced, but do not melt it. After a certain residence time in the container 1, the homogenized, softened, doughy but not molten material is, as described in detail below, removed from the container 1 through an aperture 8, passed into the intake region of an extruder 5, and received by a screw 6 there and subsequently melted.

At the level of the, in the present case single, comminution and mixing implement 3, this aperture 8 is formed in the side wall 9 of the container 1, and the pretreated plastics material can be removed from the interior of the container 1 through this aperture. The material is passed to a single-screw extruder 5 arranged tangentially on the container 1, where the housing 16 of the extruder 5 has, situated in its jacket wall, an intake aperture 80 for the material to be received by the screw 6. This type of embodiment has the advantage that the screw 6 can be driven from the lower end in the drawing by a drive, depicted only diagrammatically, in such a way that the upper end of the screw 6 in the drawing can be kept free from the drive. The discharge aperture for the plastified or agglomerated plastics material conveyed by the screw 6 can therefore be arranged at this upper end, e.g. in the form of an extruder head not depicted. The plastics material can therefore be conveyed without deflection by the screw 6 through the discharge aperture; this is not readily possible in the embodiments according to FIGS. 3 and 4.

There is connection for conveying of material or for transfer of material between the intake aperture 80 and the aperture 8, and in the present case this connection to the aperture 8 is direct and immediate and involves no prolonged intervening section and no separation. All that is provided is a very short transfer region.

In the housing 16, there is a screw 6 with compressing effect, mounted rotatably around its longitudinal axis 15. The longitudinal axis 15 of the screw 6 and that of the extruder 5 coincide. The extruder 5 conveys the material in the direction of the arrow 17. The extruder 5 is a conventional extruder known per se in which the softened plastics material is compressed and thus melted, and the melt is then discharged at the opposite end, at the extruder head.

The mixing and/or comminution implements 3 or the blades 14 are at approximately the same level as the central longitudinal axis 15 of the extruder 5. The outermost ends of the blades 14 have adequate separation from the flights of the screw 6.

In the embodiment according to FIGS. 1 and 2, the extruder 5 is, as mentioned, attached tangentially to the container 1, or runs tangentially in relation to its cross section. In the drawing, the imaginary continuation of the central longitudinal axis 15 of the extruder 5 or of the screw 6 in a direction opposite to the direction 17 of conveying of the extruder 5 towards the rear passes the axis 10 of rotation and does not intersect the same. On the outflow side, there is an offset distance 18 between the longitudinal axis 15 of the extruder 5 or of the screw 6 and the radius 11 of the container 1 that is parallel to the longitudinal axis 15 and that proceeds outwards from the axis 10 of rotation of the mixing and/or comminution implement 3 in the direction 17 of conveying of the conveyor 5. In the present case, the imaginary continuation of the longitudinal axis 15 of the extruder 5 towards the rear does not pass through the space within the container 1, but instead passes it at a short distance.

The distance 18 is somewhat greater than the radius of the container 1. There is therefore a slight outward offset of the extruder 5, or the intake region is somewhat deeper.

The expressions "opposite", "counter-" and "in an opposite sense" here mean any orientation of the vectors with respect to one another which is not acute-angled, as explained in detail below.

In other words, the scalar product of a direction vector 19 which is associated with the direction 12 of rotation and the orientation of which is tangential to the circle described by the outermost point of the mixing and/or comminution implement 3 or tangential to the plastics material passing the aperture 8, and which points in the direction 12 of rotation or movement of the mixing and/or comminution implements 3, and of a direction vector 17 which is associated with the direction of conveying of the extruder 5 and which proceeds in the direction of conveying parallel to the central longitudinal axis 15 is everywhere zero or negative, at each individual point of the aperture 8 or in the region radially immediately in front of the aperture 8, and is nowhere positive.

In the case of the intake aperture in FIGS. 1 and 2, the scalar product of the direction vector 19 for the direction 12 of rotation and of the direction vector 17 for the direction of conveying is negative at every point of the aperture 8.

The angle α between the direction vector 17 for the direction of conveying and the direction vector for the direction 19 of rotation, measured at the point 20 of the aperture 8 situated furthest upstream in relation to the direction 12 of rotation, or at the edge associated with the aperture 8 situated furthest upstream, is approximately maximally about 170°.

As one continues to proceed downwards along the aperture 8 in FIG. 2, i.e. in the direction 12 of rotation, the oblique angle between the two direction vectors continues to increase. In the centre of the aperture 8, the angle between the direction vectors is about 180° and the scalar product is maximally negative, and further downwards from there the angle indeed becomes >180° and the scalar product in turn decreases, but still remains negative. However, these angles are no longer termed angles α, since they are not measured at point 20.

An angle β, not included in the drawing in FIG. 2, measured in the centre of the aperture 8, between the direction vector for the direction 19 of rotation and the direction vector for the direction 17 of conveying is about 178° to 180°.

The apparatus according to FIG. 2 represents the first limiting case or extreme value. This type of arrangement can provide a very non-aggressive stuffing effect or a particularly advantageous feed, and this type of apparatus is particularly advantageous for sensitive materials which are treated in the vicinity of the melting range, or for product in the form of long strips.

The characterizing lengths and sections L, A and B have been included by way of example in FIG. 2. However, these, and also the other features revealed in the figures, are merely diagrammatic and are not to scale or in the correct relationship, and some of them have been shortened by interruptions in the diagram. These lengths and sections are not included in the embodiments of FIGS. 3 and 4.

In this preferred embodiment, the ratio, L/d, of the length L of the screw 6—measured from the edge 20' of the intake aperture 80 situated downstream in the direction of conveying of the screw 6, or from the point 20 which lies on this edge 20' and is situated furthest downstream in the direction of conveying of the screw 6—to the first discharge aperture 30 situated furthest upstream in relation to the direction of conveying of the screw 6 in the housing 16 at the end 31 of the screw 6 and that is distal and distant from the container, to the nominal diameter d of the screw 6 is 21.

The compressing format of the screw 6, likewise not depicted in the diagram, begins only at a distance A of six times the diameter d of the screw 6, measured from the edge 20' of the intake aperture 80. In the region in front of the beginning of its compressing format, the format of the screw 6 is in essence non-compressing or compressionless, and the screw 6 therefore exerts no pressure on the material accepted thereby.

The compressing format of the screw 6 therefore also begins, as required, in the region prior to a distance B of maximally 30 times the diameter d, measured from the edge 20' of the intake aperture 80.

Figure 3:
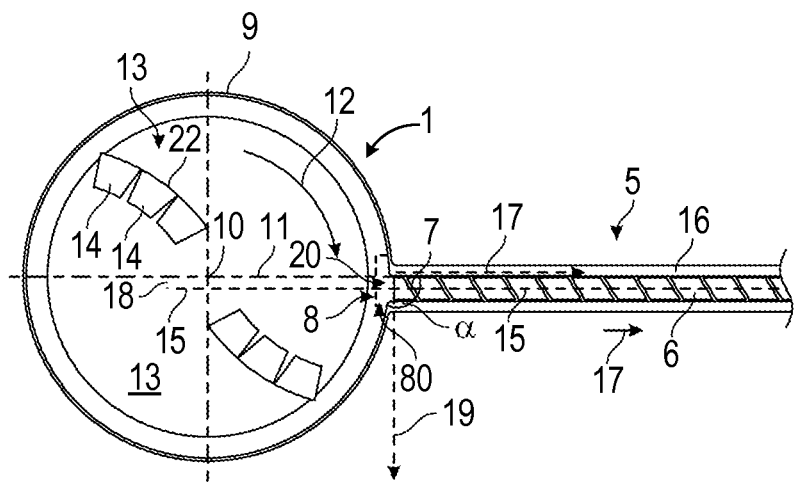
FIG. 3 shows another embodiment with minimal offset.
Figure 4:
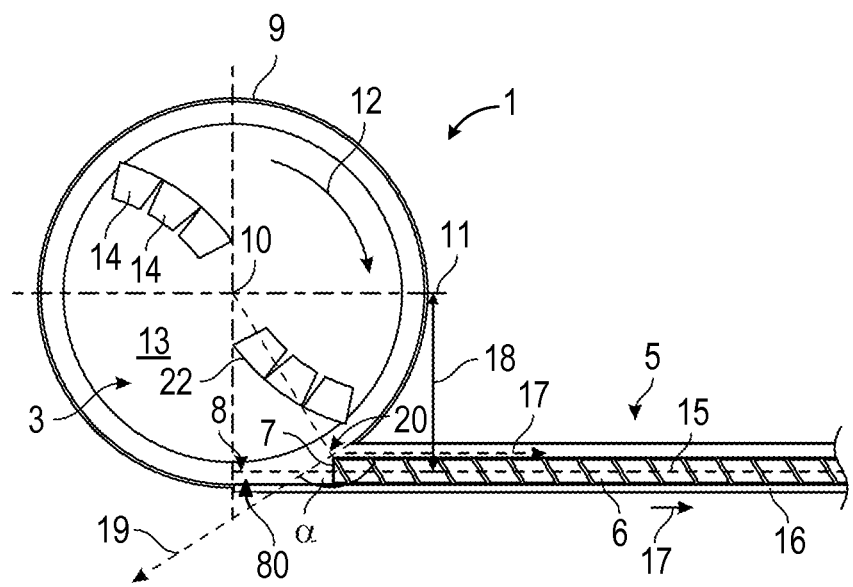
FIG. 4 shows another embodiment with relatively large offset.
Figure 5:
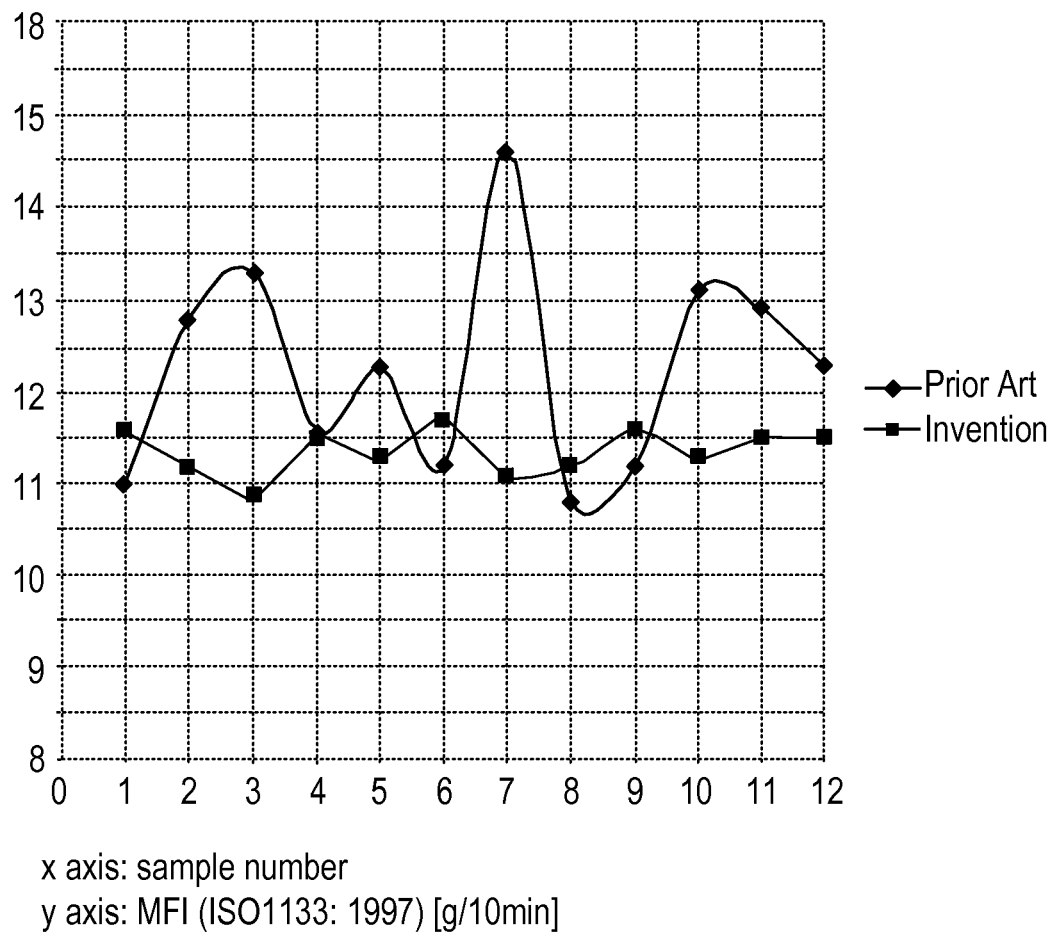
FIG. 5 collates the results.

FIGS. 3 and 4 serve mainly to illustrate the possibilities for attachment of the extruder with respect to the direction of rotation. The values for L, B and A have not been included in the drawing.

FIG. 3 shows an alternative embodiment in which the extruder 5 is attached to the container 1 not tangentially but instead by its end 7. The screw 6 and the housing 16 of the extruder 5 are adapted in the region of the aperture 8 to the shape of the inner wall of the container 1, and are offset backwards so as to be flush. No part of the extruder 5 protrudes through the aperture 8 into the space within the container 1.

The distance 18 here corresponds to about 5 to 10% of the radius 11 of the container 1 and to about half of the internal diameter d of the housing 16. This embodiment therefore represents the second limiting case or extreme value with the smallest possible offset or distance 18, where the direction 12 of rotation or of movement of the mixing and/or comminution implements 3 is at least slightly opposite to the direction 17 of conveying of the extruder 5, and specifically across the entire area of the aperture 8.

The scalar product in FIG. 3 at that threshold point 20 situated furthest upstream is precisely zero, where this is the point located at the edge of the aperture 8 situated furthest upstream. The angle α between the direction vector 17 for the direction of conveying and the direction vector for the direction 19 of rotation, measured at point 20 in FIG. 3, is precisely 90°. If one proceeds further downwards along the aperture 8, i.e. in the direction 12 of rotation, the angle between the direction vectors becomes ever greater and becomes an oblique angle >90°, and at the same time the scalar product becomes negative. However, at no point, or in no region of the aperture 8, is the scalar product positive, or the angle smaller than 90°. No local overfeed can therefore occur even in a subregion of the aperture 8, and no detrimental excessive stuffing effect can occur in a region of the aperture 8.

This also represents a decisive difference in relation to a purely radial arrangement, since there would be an angle α<90° at point 20 or at the edge 20' in a fully radial arrangement of the extruder 5, and those regions of the aperture 8 situated, in the drawing, above the radius 11 or upstream thereof or on the inflow side thereof would have a positive scalar product. It would thus be possible for locally melted plastics product to accumulate in these regions.

FIG. 4 depicts another alternative embodiment in which the extruder 5 is somewhat further offset than in FIG. 3 on the outflow side, but still not tangentially as in FIGS. 1 and 2. In the present case, as also in FIG. 3, the rearward imaginary continuation of the longitudinal axis 15 of the extruder 5 passes through the space within the container 1 in the manner of a secant. As a consequence of this, the aperture 8 is—measured in the circumferential direction of the container 1—wider than in the embodiment according to FIG. 3. The distance 18 is also correspondingly greater than in FIG. 3, but somewhat smaller than the radius 11. The angle α measured at point 20 is about 150°, and the stuffing effect is therefore reduced in comparison with the apparatus of FIG. 3; this is more advantageous for certain sensitive polymers. The inner wall of the housing 16 or the right-hand-side inner edge, as seen from the container 1, is tangential to the container 1, and therefore, unlike in FIG. 3, there is no oblique transitional edge. At this point of the aperture 8 situated furthest downstream, on the extreme left-hand side in FIG. 4, the angle is about 180°.

The invention claimed is:

1. An apparatus for the pretreatment and subsequent plastification or agglomeration of plastics with a container (1) for the material to be processed, where the container has at least one mixing and/or comminution implement (3) which rotates around an axis (10) of rotation and which is intended for the mixing, heating and optionally comminution of the plastics material, where an aperture (8) through which the pretreated plastics material can be removed from the interior of the container (1) is formed in a side wall (9) of the container (1) in the region of the level of a lowest, mixing and/or comminution implement (3) that is closest to a base of the container, where at least one extruder or compressor (5) is provided to receive the pretreated material, and has at least one screw (6) which rotates in a housing (16) and which has compressing, plastifying or agglomerating action, where the housing (16) has, located at its end (7) or in its jacket wall, an intake aperture (80) for the material to be received by the screw (6), and there is connection between the intake aperture (80) and the aperture (8), wherein the imaginary continuation of the central longitudinal axis (15) of the extruder (5) or of the screw (6) closest to the intake aperture (80), in a direction opposite to the direction (17) of conveying of the extruder (5), passes, and does not intersect, the axis (10) of rotation, there being, on the outflow side or in the direction (12) of rotation or of movement of the mixing and/or comminution implement (3), an offset distance (18) between the longitudinal axis (15) of the extruder (5) or of the screw (6) closest to the intake aperture (80), and a radius (11) of the container (1) that is parallel to the longitudinal axis (15) and that proceeds outwards from the axis (10) of rotation of the mixing and/or comminution implement (3) in the conveying direction (17) of the extruder (5), and that the ratio of the length (L) of the screw (6), measured from an edge (20') of the intake aperture (80) situated downstream in the direction of conveying of the screw (6), or from the point (20) of the intake aperture (80) situated furthest downstream, to the end of the screw (6) or to a first melt discharge aperture (30) in the housing (16), situated furthest upstream in relation to the conveying direction of the screw (6) at the end (31) of the screw (6) that is distal, remote from the container, to the nominal diameter (d) of the screw (6) is ≥7, and that the compressing format of the screw (6) begins only from a distance (A) of more than 1.5 times the diameter (d) of the screw (6), measured from the edge (20') situated downstream in the conveying direction of the screw (6) or from the point (20) of the intake aperture (80) situated furthest downstream, where the beginning of the compressing format of the screw (6) is the point at which the helix angle of the screw (6) is for the first time ≥1°, where the design of the screw (6) in the region in front of the beginning of the compressing format is substantially compressionless or decompressing and the helix angle is <1°, where the helix angle is the angle between the central longitudinal axis (15) of the screw (6) or parallel thereto and a straight line or curve drawn through the respectively lowest points of each screw channel.

2. The apparatus according to claim 1, wherein the compressing format of the screw (6) begins in the region in front of a distance (D) which is maximally 30 times, the diameter (d) measured from the edge (20') of the intake aperture (80) situated downstream in the direction of conveying of the screw (6).

3. The apparatus according to claim 1, wherein the ratio of the length (L) of the screw (6), measured from the edge (20') of the intake aperture (80) situated downstream in the direction of conveying of the screw (6) to the first discharge aperture (30), to the nominal diameter (d) of the screw (6) is ≥10.

4. The apparatus according to claim 1, wherein the compressing format of the screw (6) begins only from a distance (A) of more than twice, the diameter (d) of the screw (6), measured from the edge (20') of the intake aperture (80) situated downstream in the conveying direction of the screw (6).

5. The apparatus according to claim 1, wherein the length of the compressing format of the screw (6) is in the range from 0.5 to 7 times, the diameter (d) of the screw (6).

6. The apparatus according to claim 1, wherein, for an extruder (5) in contact with the container (1), the scalar product of a direction vector that is associated with the direction (19) of rotation and that is tangential to the circle described by the radially outermost point of the mixing and/or comminution implement (3) or that is tangential to the plastics material transported past the aperture (8) and that is normal to a radius (11) of the container (1), and that points in the direction (12) of rotation or of movement of the mixing and/or comminution implement (3) and of the direction vector (17) that is associated with the direction of conveying of the extruder (5) at each individual point or in the entire region of the aperture (8) or immediately radially in front of the aperture (8), is zero or negative.

7. The apparatus according to claim 1, wherein a angle (α) included between a direction vector that is associated with the direction (19) of rotation of the radially outermost point of the mixing and/or comminution implement (3) and a direction vector (17) that is associated with the direction of conveying of the extruder (5) is greater than or equal to 90° and smaller than or equal to 180°, measured at a point of intersection of the two direction vectors (17, 19) at the inflow-side edge of the aperture (8) that is situated upstream in relation to the direction (12) of rotation or of movement of the mixing and/or comminution implement (3).

8. The apparatus according to claim 1, wherein a angle (β) included between a direction vector (19) that is associated with the direction (12) of rotation or of movement and a direction vector (17) that is associated with the direction of conveying of the extruder (5) is from 170° to 180°, measured at a point of intersection of the two direction vectors (17, 19) in a middle of the aperture (8).

9. The apparatus according to claim 1, wherein the offset distance (18) is greater than or equal to half of the internal diameter of the housing (16) of the extruder (5) or of the screw (6), and/or greater than or equal to 7%, of the radius of the container (1), or wherein the offset distance (18) is greater than or equal to the radius of the container (1).

10. The apparatus according to claim 1, wherein the imaginary continuation of the longitudinal axis (15) of the extruder (5) in a direction opposite to the direction of conveying is arranged in the manner of a secant in relation to the cross section of the container (1), and, at least in sections, passes through the space within the container (1).

11. The apparatus according to claim 1, wherein the extruder (5) is attached tangentially to the container (1) or runs tangentially in relation to the cross section of the container (1), or wherein the longitudinal axis (15) of the extruder (5) or of the screw (6) or the longitudinal axis of the screw (6) closest to the intake aperture (80) runs tangentially with respect to the inner side of the side wall (9) of the container (1), or the inner wall of the housing (16) does so, or an envelope defined by rotation of the screw (6) does so, where there is a drive connected to the end (7) of the screw (6), and that the screw provides conveying, at its opposite end, to a discharge aperture.

12. The apparatus according to claim 1, wherein there is immediate and direct connection between the aperture (8) and the intake aperture (80), without substantial separation, and without a transfer section or a conveying screw.

13. The apparatus according to claim 1, wherein the mixing and/or comminution implement (3) comprises implements and/or blades (14) which, in the direction (12) of rotation or of movement, have a comminuting, cutting and heating effect on the plastics material, where the implements and/or blades (14) are arranged or formed on or at a rotatable implement carrier (13) which is arranged parallel to a basal surface (2) of the container.

14. The apparatus according to claim 1, wherein a curvature of frontal edges (22) that are associated with blades of the mixing and/or comminution implement (3) act on the plastics material and point in the direction (12) of rotation or of movement, differs when comparison is made with rearward edges (22) of the blades of the mixing and/or comminution implement (3).

15. The apparatus according to claim 1, wherein the container (1) is in essence cylindrical with circular cross section and with a level basal surface (2) and with, orientated vertically in relation thereto, a side wall (9) which has the shape of the jacket of a cylinder, and/or the axis (10) of rotation of the mixing and/or comminution implement (3) coincides with the central axis of the container (1), and/or the axis (10) of rotation or the central axis are orientated vertically and/or normally in relation to the basal surface (2).

16. The apparatus according to claim 15, wherein a lowest implement carrier (13) or the lowest of the mixing and/or comminution implements (3) and/or the aperture (8) are arranged in the lowest quarter of the height of the container (1), at a distance of from 10 mm to 400 mm from the basal surface (2).

* * * * *